United States Patent
Souche et al.

(10) Patent No.: US 11,836,904 B2
(45) Date of Patent: Dec. 5, 2023

(54) UTILIZING A NEURAL NETWORK MODEL TO GENERATE A REFERENCE IMAGE BASED ON A COMBINATION OF IMAGES

(71) Applicant: Accenture Global Solutions Limited, Dublin (IE)

(72) Inventors: Christian Souche, Cannes (FR); Edouard Mathon, Antibes (FR); Ji Tang, Valbonne (FR)

(73) Assignee: Accenture Global Solutions Limited, Dublin (IE)

( * ) Notice: Subject to any disclaimer, the term of this patent is extended or adjusted under 35 U.S.C. 154(b) by 430 days.

(21) Appl. No.: 17/210,176

(22) Filed: Mar. 23, 2021

(65) Prior Publication Data

US 2022/0309631 A1    Sep. 29, 2022

(51) Int. Cl.
*G06T 5/50*    (2006.01)
*G06N 3/08*    (2023.01)
*G06F 18/214*    (2023.01)

(52) U.S. Cl.
CPC .............. *G06T 5/50* (2013.01); *G06F 18/214* (2023.01); *G06N 3/08* (2013.01); *G06T 2207/20081* (2013.01); *G06T 2207/20084* (2013.01); *G06T 2207/20221* (2013.01)

(58) Field of Classification Search
CPC .............. G06T 5/50; G06T 2207/20081; G06T 2207/20084; G06T 2207/20221; G06F 18/214; G06F 16/907; G06F 16/9562; G06N 3/08
See application file for complete search history.

(56) References Cited

U.S. PATENT DOCUMENTS

| | | | |
|---|---|---|---|
| 9,325,804 B2* | 4/2016 | Hamilton | G06T 11/00 |
| 9,731,514 B2* | 8/2017 | Eliav | G07F 13/065 |
| 10,311,913 B1* | 6/2019 | Shekhar | G06V 20/41 |

(Continued)

FOREIGN PATENT DOCUMENTS

GB    2491487 A    12/2012

OTHER PUBLICATIONS

Joshua S. White, Jeanna N. Matthews, John L. Stacy, "A method for the automated detection phishing websites through both site characteristics and image analysis," Proc. SPIE 8408, Cyber Sensing 2012, 84080B (May 7, 2012); doi: 10.1117/12.918956.*

(Continued)

*Primary Examiner* — Xuemei G Chen
(74) *Attorney, Agent, or Firm* — Harrity & Harrity, LLP

(57) ABSTRACT

A device may receive complex data from a user device and may provide multiple images to the user device based on receiving the complex data. The device may receive, from the user device, a selection of two or more images from the multiple images, and may determine whether a combination of the two or more images is stored in a data structure. The device may determine a mapping of information identifying the two or more images with the complex data, based on the combination of the two or more images not being stored in the data structure, and may store the information identifying the two or more images, the complex data, and the mapping in the data structure. The device may process the two or more images to generate a reference image that satisfies a memorability score threshold and may provide the reference image to another user device.

20 Claims, 10 Drawing Sheets

(56) References Cited

U.S. PATENT DOCUMENTS

| | | | |
|---|---|---|---|
| 10,904,286 B1* | 1/2021 | Liu | H04L 9/3236 |
| 2003/0028543 A1* | 2/2003 | Dusberger | G06F 16/955 |
| | | | 707/E17.112 |
| 2003/0233425 A1 | 12/2003 | Lyons et al. | |
| 2007/0260979 A1* | 11/2007 | Hertzfeld | G06T 11/60 |
| | | | 715/209 |
| 2011/0145688 A1 | 6/2011 | Han et al. | |
| 2012/0203929 A1* | 8/2012 | Patalsky | G06F 16/9566 |
| | | | 709/245 |
| 2017/0147906 A1* | 5/2017 | Shekhar | G06V 20/62 |
| 2020/0057807 A1* | 2/2020 | Kapur | G06N 3/045 |
| 2020/0374313 A1* | 11/2020 | Manoselvam | G06N 20/00 |

OTHER PUBLICATIONS

Extended European Search Report for Application No. EP22163698.8, dated Aug. 2, 2022, 9 pages.

Guinness, "The 8 best URL shorteners of 2021," Zapier, Mar. 2021, 11 pages [retrieved from https://zapier.com/blog/best-url-shorteners/].

McLachlan, "12 of the Best Link Shorteners That Aren't the Google URL Shortener," Hootsuite, Mar. 2021, 20 pages [retrieved from https://blog.hootsuite.com/what-are-url-shorteners/].

Bhardwaj, "6 Best URL Shortener Services to Shrink and Track Links," Themeisle, May 2021, 13 pages [retrieved from https://themeisle.com/blog/best-url-shortener/].

Capsulink, 5 pages [retrieved on May 18, 2021 from https://www.capsulink.com/].

Bitly, 4 pages [retrieved on May 18, 2021 from https://bitly.com/].

Tinyurl, 1 page [retrieved on May 18, 2021 from https://tinyurl.com/].

Hyperlink, 7 pages [retrieved on May 18, 2021 from https://usehyperlink.com/].

Michalowicz, "7 Tricks to Help You Remember Anything," American Express, Sep. 2013, 8 pages [retrieved from https://www.americanexpress.com/en-us/business/trends-and-insights/articles/7-tricks-to-help-you-remember-anything/].

Grady et al., "Neural correlates of the episodic encoding of pictures and words," Proceedings of the National Academy of Sciences of the USA, vol. 95, Mar. 1998, pp. 2703-2708 [retrieved from https://www.pnas.org/content/95/5/2703].

Balderston et al., "Anxiety Patients Show Reduced Working Memory Related dlPFC Activation During Safety and Threat," Depression and Anxiety, Apr. 2016, 12 pages [retrieved from https://onlinelibrary.wiley.com/doi/abs/10.1002/da.22518].

Fastrich et al., "The role of interest in memory for trivia questions: An investigation with a large-scale database," Motivation Science, Sep. 2018, vol. 4, No. 3, pp. 227-250 [retrieved from https://pubmed.ncbi.nlm.nih.gov/30221181/#:~:text=Abstract,been%20established%20in%20previous%20studies.&text=A%20multilevel%20structural%20equation%20model,in%20the%20questions'%20answer].

"Create a linked image in your content," HubSpot, Knowledge Base, Feb. 2021, 4 pages [retrieved from https://knowledge.hubspot.com/cos-pages-editor/how-do-i-link-an-image].

Reyes, "Consumers have higher emotional responses to and recollection of influencer ads than other ad types," Insider Intelligence, Aug. 2019, 1 page [retrieved from https://content-na1.emarketer.com/consumers-have-higher-emotional-responses-to-and-recollection-of-influencer-ads-than-other-ad-types-2019-8].

* cited by examiner

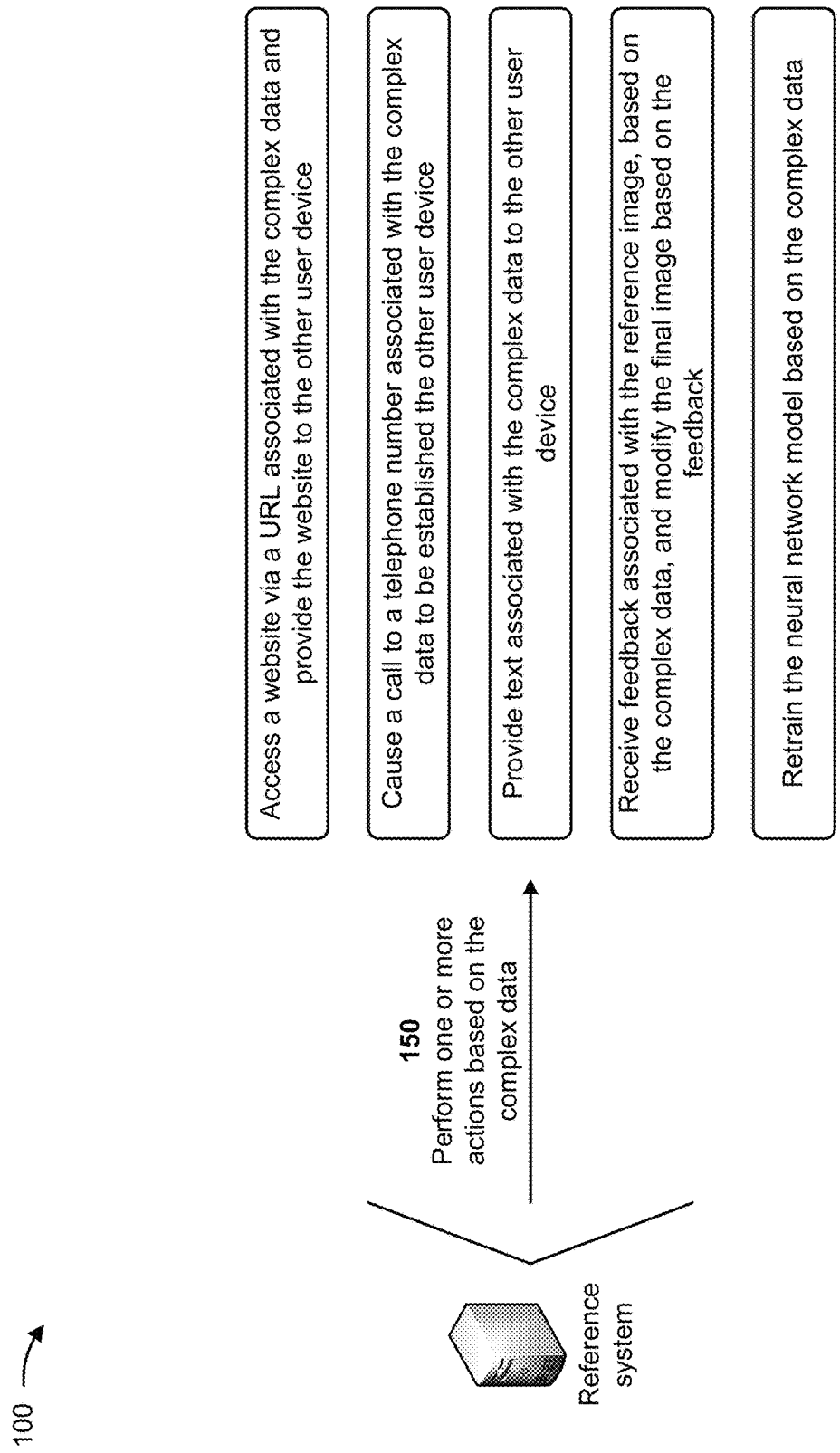

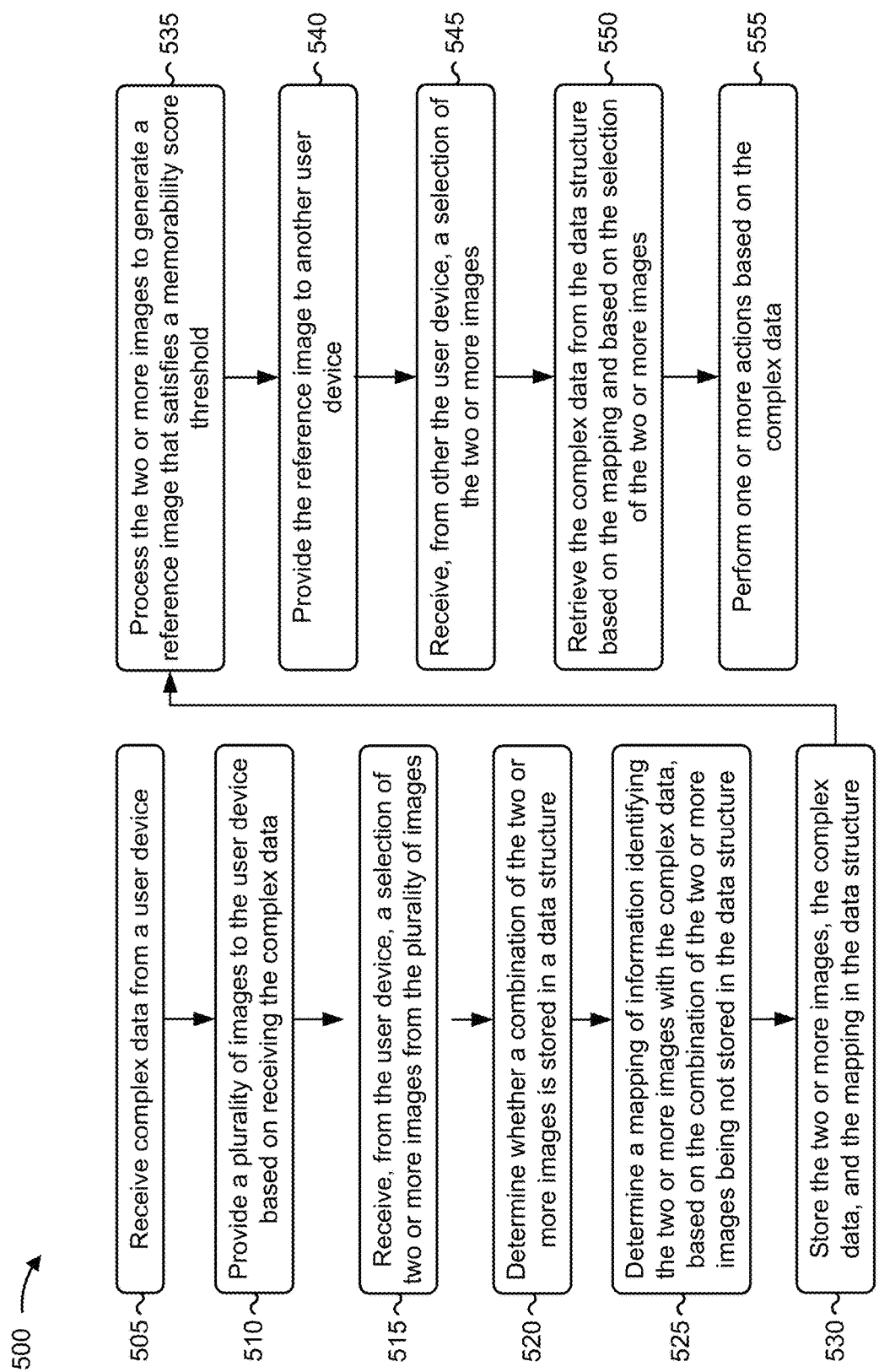

UTILIZING A NEURAL NETWORK MODEL TO GENERATE A REFERENCE IMAGE BASED ON A COMBINATION OF IMAGES

BACKGROUND

Memorability may indicate a likelihood that an image will be remembered by a user (e.g., by being stored in a short-term memory or a long-term memory of the user). A memorability score of the image may correspond to a percentage of users that remember the image after the image has been presented multiple times. The memorability score may be used to determine a measure of effectiveness of the image with respect to the users.

SUMMARY

In some implementations, a method may include receiving complex data from a user device and providing a plurality of images to the user device based on receiving the complex data. The method may include receiving, from the user device, a selection of two or more images from the plurality of images and determining whether a combination of the two or more images is stored in a data structure. The method may include determining a mapping of the two or more images with the complex data, based on the combination of the two or more images not being stored in the data structure, and storing information identifying the two or more images, the complex data, and the mapping in the data structure. The method may include processing the two or more images to generate a reference image that satisfies a memorability score threshold and providing the reference image to another user device. The method may include receiving, from the other user device, a selection of the two or more images, and retrieving the complex data from the data structure based on the mapping and based on the selection of the two or more images. The method may include performing one or more actions based on the complex data.

In some implementations, a device includes one or more memories and one or more processors to receive complex data from a user device, wherein the complex data includes one or more of: a uniform resource locator, a telephone number, or textual information, and provide a plurality of images to the user device based on receiving the complex data. The one or more processors may receive, from the user device, a selection of two or more images from the plurality of images and may determine whether a combination of the two or more images is stored in a data structure. The one or more processors may determine a mapping of the two or more images with the complex data, based on the combination of the two or more images not being stored in the data structure, and may store information identifying the two or more images, the complex data, and the mapping in the data structure. The one or more processors may process the two or more images to generate a reference image that satisfies a memorability score threshold and may provide the reference image to another user device. The one or more processors may receive, from the other user device, a selection of the two or more images, and may retrieve the complex data from the data structure based on the mapping and based on the selection of the two or more images. The one or more processors may perform one or more actions based on the complex data.

In some implementations, a non-transitory computer-readable medium may store a set of instructions that includes one or more instructions that, when executed by one or more processors of a device, cause the device to receive complex data from a user device, and provide a plurality of images to the user device based on receiving the complex data. The one or more instructions may cause the device to receive, from the user device, a selection of two or more images from the plurality of images and determine whether a combination of the two or more images is stored in a data structure. The one or more instructions may cause the device to determine a mapping of the two or more images with the complex data, based on the combination of the two or more images not being stored in the data structure, and store information identifying the two or more images, the complex data, and the mapping in the data structure. The one or more instructions may cause the device to process the two or more images to generate a reference image that satisfies a memorability score threshold and provide the reference image to another user device.

BRIEF DESCRIPTION OF THE DRAWINGS

FIGS. 1A-1F are diagrams of an example implementation described herein.

FIG. 5 is a flowchart of an example process for utilizing a neural network model to generate a reference image based on complex data.

DETAILED DESCRIPTION

Figure 1A:
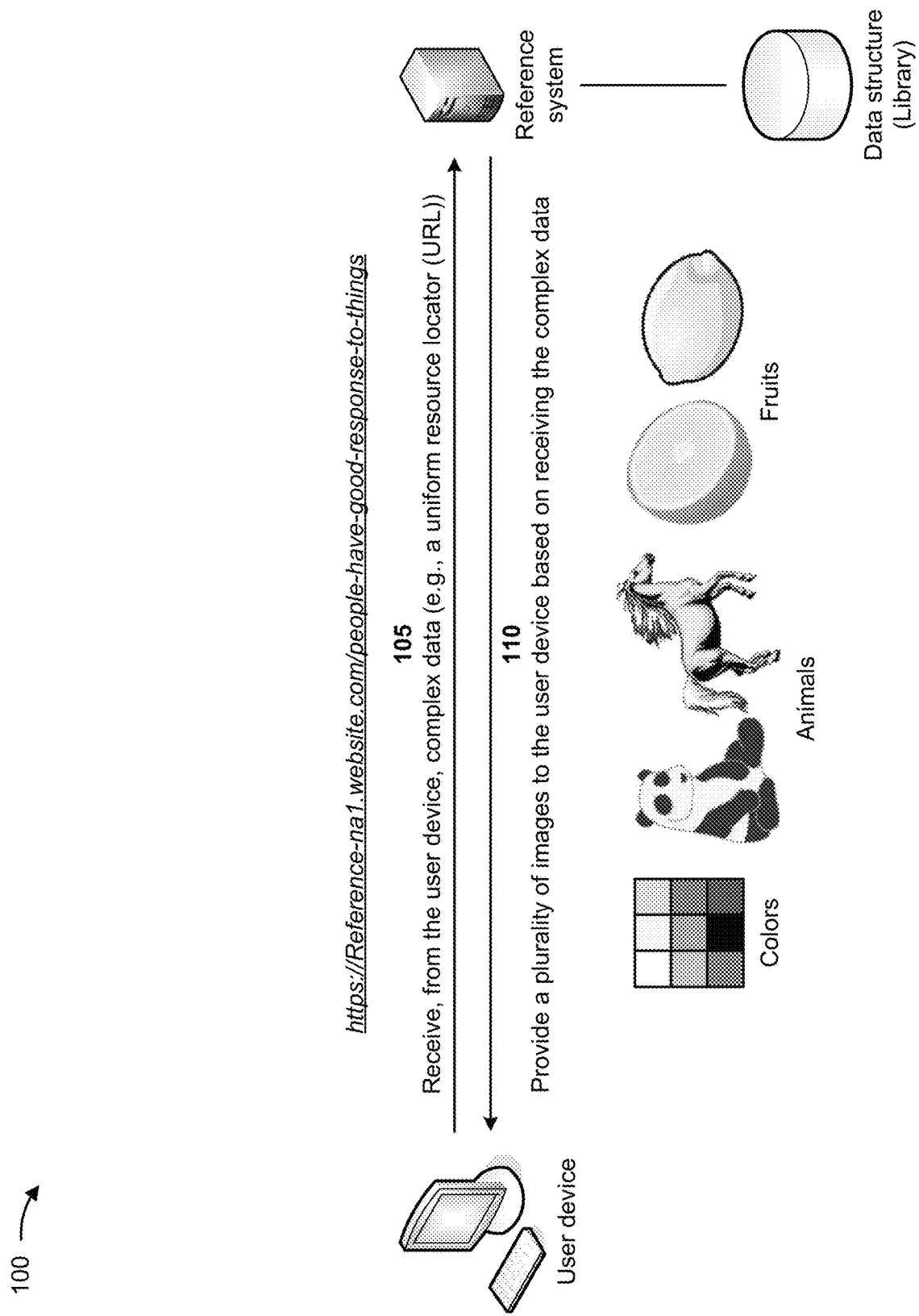

The following detailed description of example implementations refers to the accompanying drawings. The same reference numbers in different drawings may identify the same or similar elements.

A length of a uniform resource locator (URL) may be shortened to create a shortened URL. For example, a URL (e.g., "http://en.wikipedia.org/wiki/Test Data") may be shortened to a shortened URL (e.g., "https://bit.ly/1sNZMwL"). Current techniques for shortening URLs utilize computing resources, networking resources, among other resources. Although a length of a shortened URL is less than a length of a URL, the shortened URL may be more difficult for users to remember than the URL. Furthermore, the shortened URL may include characters that are visually similar (e.g., "0," "O," and "o"; "1," "l," and "I"; and "8" and "B"; and so on). Such visually similar characters are confusing to users and difficult for users to distinguish. Additionally, the shortened URL may be subject to an increased risk associated with phishing attacks.

Therefore, current techniques for URL shortening waste computing resources (e.g., processing resources, memory resources, communication resources, among other examples), networking resources, and/or other resources associated with generating a shortened URL that is not memorable and confusing for users, causing a device to access an incorrect network resource associated with a shortened URL (when the characters of the shortened URL are erroneously input into the device), causing a device to access a malicious network resource associated with a phishing attack, taking remedial actions against the phishing attacks, among other examples.

Some implementations described herein relate to a reference system that utilizes a neural network model to generate a reference image based on a combination of images. For example, the reference system may receive complex data from a user device and may provide a plurality of images to the user device based on receiving the complex data. The complex data may include a uniform resource locator, a telephone number, textual information, among other examples. The reference system may receive, from the user device, a selection of two or more images from the plurality of images and may determine whether a combination of the two or more images is stored in a data structure. For example, the reference system may determine whether the data structure stores a mapping of the two or more images with other complex data.

Based on the combination of the two or more images not being stored in the data structure, the reference system may determine a mapping of the two or more images with the complex data and may store the two or more images, the complex data, and the mapping in the data structure. The reference system may process the two or more images, with a neural network model, to generate a reference image that satisfies a memorability score threshold and may provide the reference image to another user device. In some implementations, the reference image may only be displayed (e.g., to a user of the other device) to help the user remember the information needed to retrieve the complex data (e.g., to help the user remember the two or more images). In some examples, the reference image may cover (or include) information and/or features included in the two or more images. The reference system may receive, from the other user device, a selection of the two or more images, and may retrieve the complex data from the data structure based on the mapping and based on the selection of the two or more images.

The reference system may perform one or more actions based on the complex data. For example, in a situation where the complex data corresponds to a URL, the reference system may cause a web page, associated with the URL, to be provided to the other user device based on selection of the reference image. Additionally, or alternatively, in a situation where the complex data corresponds to a telephone number, the reference system may cause a call to a telephone number, associated with the complex data, to be established with the other user device. Additionally, or alternatively, in a situation where the complex data corresponds to text, the reference system may provide text, associated with the complex data, to the other user device.

As described herein, the reference system utilizes a neural network model to generate a reference image based on a combination of images. For example, the reference image may be a memorable image that may help the user select the complex data (e.g., help the user to remember the two or more images that may be used to retrieve the complex data). By generating the reference image in this manner, the reference system conserves computing resources (e.g., processing resources, memory resources, communication resources, among other examples), networking resources, and/or other resources that would otherwise have been consumed by generating a shortened URL that is not memorable and is confusing for users, causing a device to access an incorrect network resource associated with a shortened URL (when the characters of the URL are erroneously input into the device), causing a device to access a malicious network resource associated with a phishing attack, taking remedial actions against the phishing attacks, among other examples.

FIGS. 1A-1F are diagrams of an example 100 associated with utilizing a neural network model to generate a reference image based on a combination of images. As shown in FIGS. 1A-1F, example 100 includes a user device, a reference system, and a data structure (e.g., a database, a table, a linked list, among other examples). The user device may include a laptop computer, a mobile telephone, a desktop computer, among other examples. The user device may be associated with a user.

The reference system may include one or more devices that utilize a neural network model to generate a reference image associated with a combination of images. The reference image may include a combination of different images (e.g., a combination of content of different images). The complex data may include a uniform resource locator, a telephone number, textual information, among other examples. In some examples, the reference image may be used to enable users to access the complex data.

The data structure may store a plurality of categories of images that may be used by the reference system to generate reference images associated with different complex data. The plurality of categories of images may include a first category of images (e.g., images of colors), a second category of images (e.g., images of animals), a third category of images (e.g., image of fruits), and a fourth category of images (e.g., images of locations), and so on. In some examples, each image may be associated with information identifying content of the image (e.g., metadata identifying the content). In some implementations, the reference system may use the information identifying the content to identify complex data, as described in more detail below.

Additionally, or alternatively, the data structure may store information identifying two or more images (of the plurality of categories of images) in association with different complex data (e.g., a first mapping of two or more first images and first complex data, a second mapping of two or more second images and second complex data, and so on), among other examples. In some implementations, the plurality of categories of images may include one or more images or one or more categories of images provided to the data structure by a device of an administrator of the data structure, by the reference system, by the user device, by another device of the user, among other examples. In some implementations, the information identifying the two or more images in association with the different complex data may be provided to the data structure by the reference system.

As shown in FIG. 1A, and by reference number 105, the reference system may receive, from the user device, complex data. For example, assume that the user desires to create a reference image associated with complex data and that the complex data includes a uniform resource locator (URL). As shown in FIG. 1A, the URL may be "https://Referencenal.website.com/people-have-good-response-to-things").

Further assume that the user desires to create the reference image to prevent the user and/or one or more other users (associated with the user) from becoming victims of a phishing attack associated with the URL. Additionally, or alternatively, assume that the user desires to create the reference image to prevent the user and/or the one or more other users from incorrectly inputting the URL (thereby preventing access to an incorrect network resource). The user and the one or more users may be members of a same organization. The user device may provide, to the reference system, a request to generate the reference image associated with the URL. The reference system may receive (e.g., from the user device) the request to generate the reference image associated with the URL. In some examples, the request may include information identifying the URL, information identifying the user, among other examples.

As shown in FIG. 1A, and by reference number 110, the reference system may provide a plurality of images to the user device based on receiving the complex data. For example, based on receiving the request (e.g., including the URL), the reference system may obtain the plurality of images from the data structure and provide the plurality of images to the user device. In some examples, the reference system may cause the plurality of images to be displayed by the user device (e.g., via a user interface). As shown in FIG. 1A, for example, the plurality of images may include the first category of images (images of colors), the second category of images (images of animals), and the third category of images (images of fruits).

In some implementations, the plurality of images may be a subset of images stored by the data structure. By obtaining and providing the subset of images, the reference system may conserve computing resources, network resources, and/or storage resources that would have otherwise been consumed to obtain and provide an entirety of the images stored by the data structure.

In some examples, the reference system may identify the plurality of images based on the information identifying the user (e.g., included in the request) and use the information identifying the user to perform a lookup of the data structure. In some implementations, the data structure may store information identifying one or more categories of images in association with information identifying different users (e.g., information identifying one or more first categories of images in association with information identifying a first group of users, information identifying one or more second categories of images in association with information identifying a second group of users, and so on). For example, the reference system may determine (e.g., based on historical data) that the one or more first categories of images are categories of images that are most memorable to the first group of users. For example, the one or more first categories of images may include images of vehicles and the first group of users may be male users. The reference system may determine (e.g., based on historical data) that the one or more second categories of images are categories of images that are most memorable to the second group of users. For example, the one or more second categories of images may include images of video games and the second group of users may be video gamers.

In some examples, the one or more first categories of images may be different than the one or more second categories of images. For example, the one or more first categories of images may include images of colors, images of animals, and images of fruits and the one or more second categories of images may include images of colors, images of vehicles, images of clothes, and images of shoes.

The reference system may use the information identifying the user to perform a lookup of the data structure and obtain the one or more categories of images associated with the information identifying the user. The plurality of images, provided to the user device, may include the one or more categories of images associated with the information identifying the user.

Figure 1B:
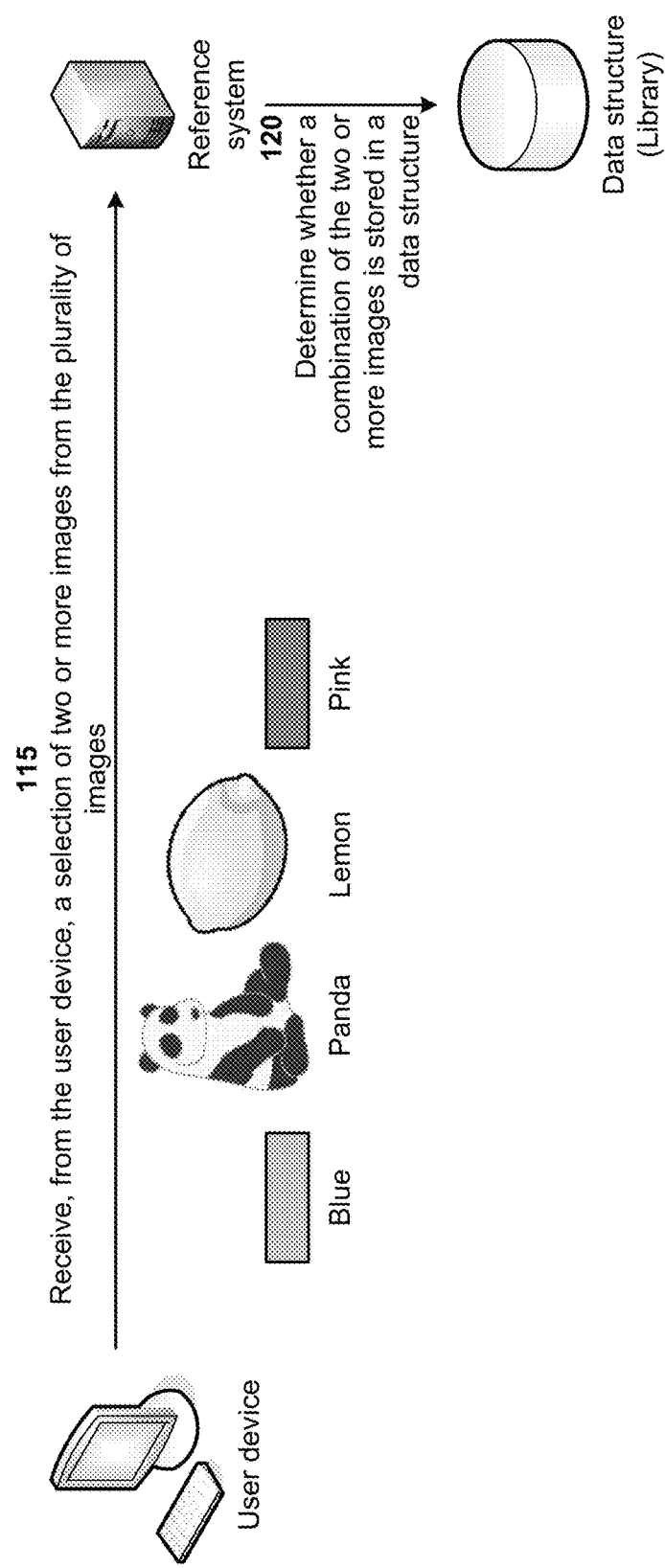

As shown in FIG. 1B, and by reference number 115, the reference system may receive, from the user device, a selection of two or more images from the plurality of images. For example, after providing the plurality of images to the user device, the reference system may provide, to the user device, a selection request to select images from the plurality of images. The user device may select the two or more images from the plurality of images and the reference system may receive, from the user device, information identifying the two or more images selected by the user. In some implementations, the user device may select a quantity of images and cause the reference system to select the two or more images from the plurality of images based on the quantity of images.

In some implementations, the quantity of images (selected by the user device) may be based on a measure of frequency of usage (or a measure of popularity) of the URL. In some examples, the reference system may analyze the URL and/or perform a search of web documents to determine the measure of frequency of usage (or the measure of popularity) of the URL. For example, the reference system may provide a request to select two (2) images if the URL is a frequently used URL, three (3) images if the URL is a less frequently used URL, four (4) images if the URL is even less frequently used, and so on. Alternatively, the reference system may provide a request to select four (4) images if the URL is a frequently used URL, three (3) images if the URL is a less frequently used URL, two (2) images if the URL is even less frequently used, and so on. In some examples, the reference system may provide a request to select two (2) images to represent a domain name associated with the URL.

As shown in FIG. 1B, assume the user device selects four (4) images: an image of the color blue, an image of a panda, an image of a lemon, and an image of the color pink. Thus, the user device may provide, and the reference system may receive, information identifying the four (4) images.

As shown in FIG. 1B, and by reference number 120, the reference system may determine whether a combination of the two or more images is stored in the data structure. For example, based on receiving the information identifying the one or more images (from the user device), the reference system may perform a lookup of the data structure to determine whether the one or more images (e.g., the combination of the one or more images) are associated (in the data structure) with other complex data that is different than the complex data.

In some implementations, when the reference system determines that the combination of the two or more images) are associated with other complex data in the data structure, the reference system may provide, to the user device, a selection request to select two or more new images from the plurality of images. Alternatively, the reference system may provide, to the user device, a selection request to select two or more new images from the plurality of images when the reference system determines that another combination of images is within a particular level of similarity with respect to the combination of two or more images (e.g., a percentage of the images (in the combination of the two or more images) is included in the images of the other combination of images). For example, the reference system may determine that the combination of purple, panda, lemon, and pink is similar to the combination of blue, panda, lemon, and pink. some percentage of the images has to be different (e.g., two of the four need to be different). In some examples, the reference system may provide information identifying the other combination of images when providing the plurality of images (after determining that the one or more images are associated with other complex data). In some examples, after the user device selects two or more images, the reference system may disable images that may create a combination of images that is similar to other combination of images stored in the data structure.

Alternatively to providing the selection request to select two or more new images from the plurality of images, the reference system may provide, to the user device, a selection request to select two or more new images from a different plurality of images. Additionally, or alternatively, the reference system may provide, to the user device, a selection request to select an image from the plurality of images and an image from a different plurality of images.

Figure 1C:
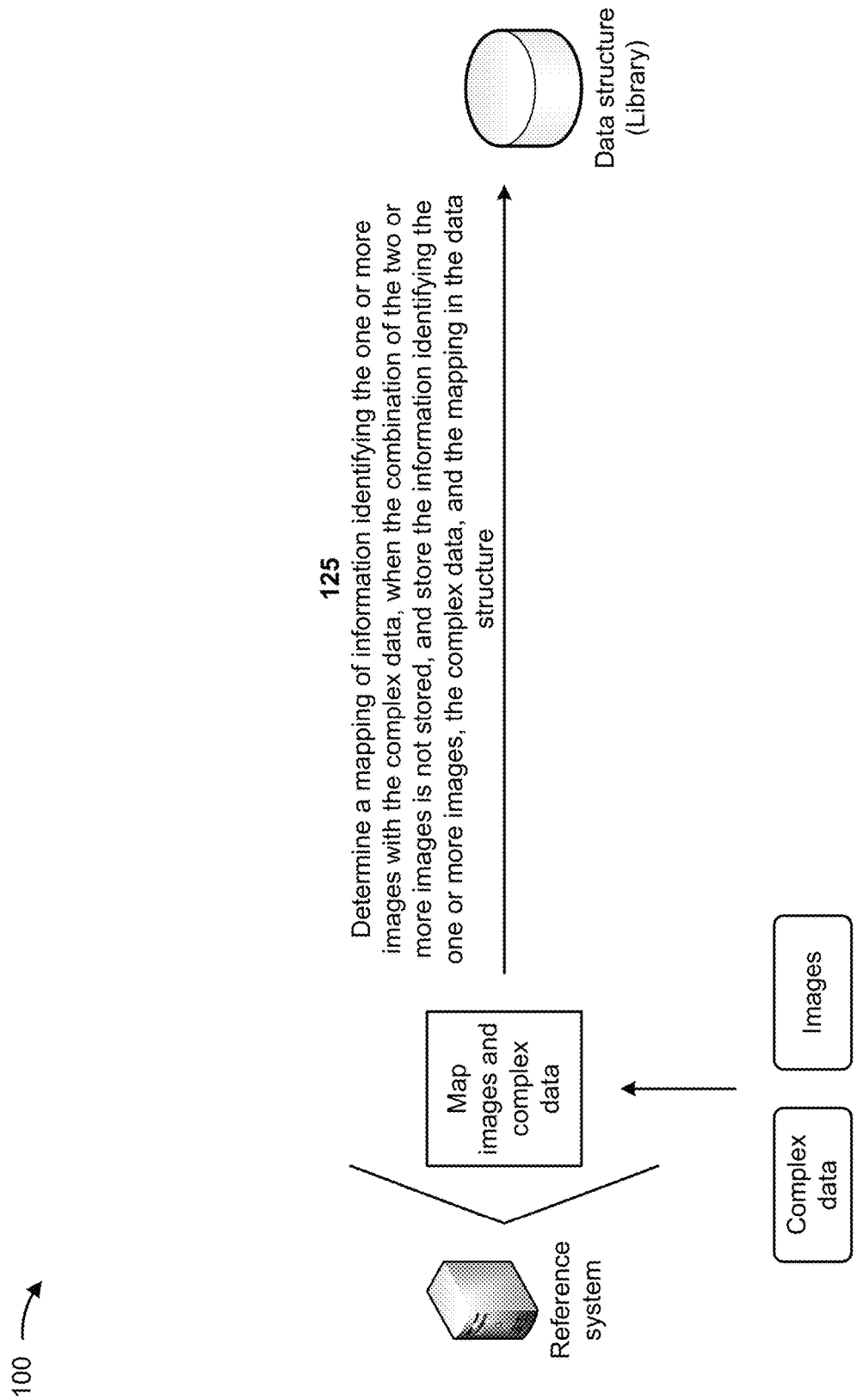

As shown in FIG. 1C, and by reference number 125, the reference system may determine a mapping of information identifying the two or more images with the complex data, when the combination of the two or more images is not stored in the data structure, and may store the information identifying the two or more images, the complex data, and the mapping in the data structure. For example, assume that the combination of the two or more images (or the selected two or more images) are not associated (in the data structure) with other complex data. The reference system may generate the mapping of the information identifying the two or more images with the complex data (e.g., the URL). In some examples, the mapping may correlate the two or more images with the URL. The reference system may provide the mapping to the data structure for storage. In some implementations, the mapping may include information identifying the content of the two or more images (e.g., metadata of the two or more images). As an example, the mapping may additionally or alternatively associate the words blue, panda, lemon, and pink with the URL.

Figure 1D:
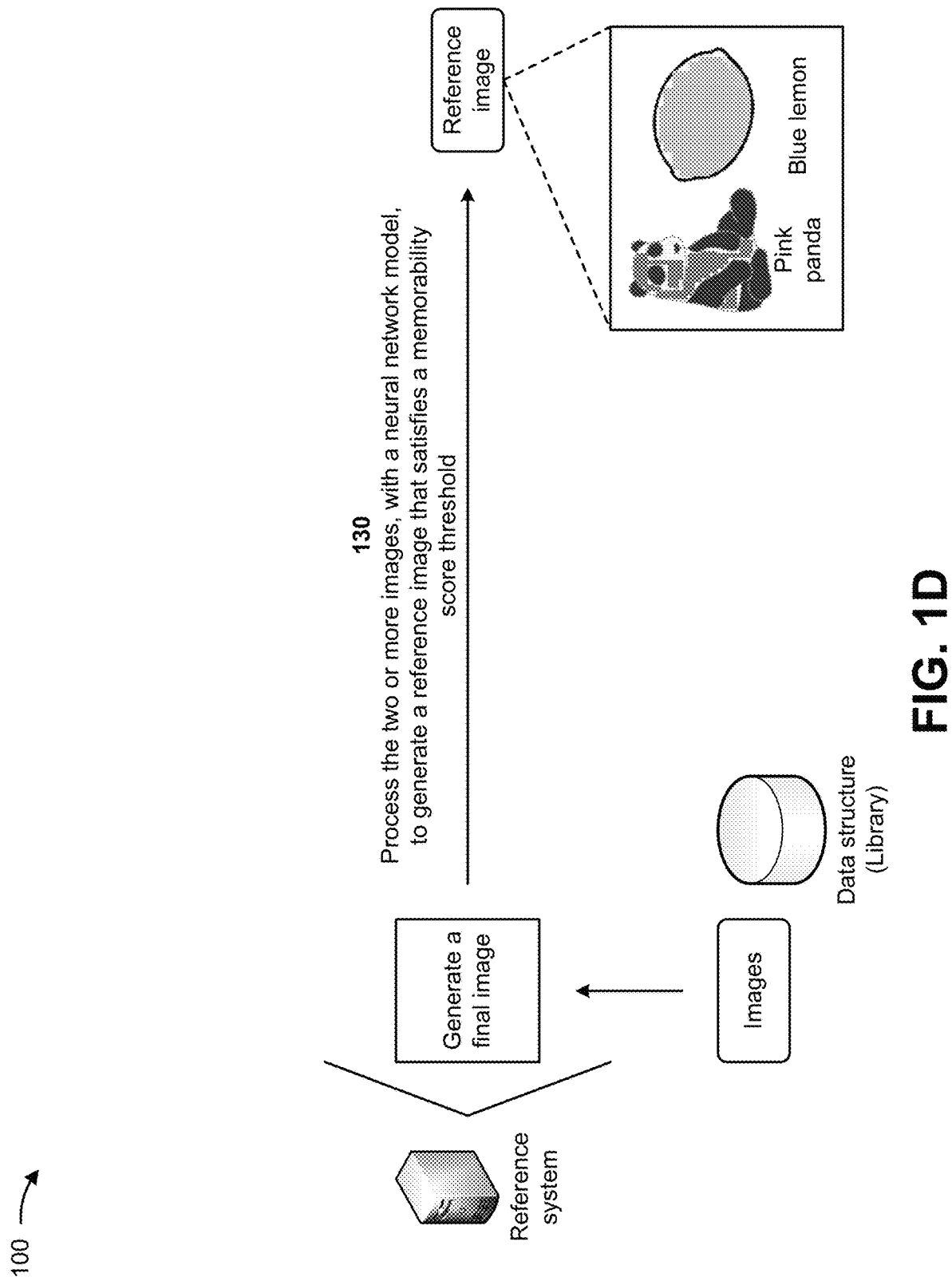

As shown in FIG. 1D, and by reference number 130, the reference system may process the two or more images, with a neural network model, to generate a reference image that satisfies a memorability score threshold. In some implementations, the reference system may combine the one or more images in different manners to generate a plurality of combined images. For example, when generating the plurality of combined images, the reference system may combine the color blue and the panda to generate an image of a blue panda, combine the color pink and the panda to generate an image of a pink panda, combine the color blue and a lemon to generate an image of a blue lemon, combine the color pink and a lemon to generate an image of a pink lemon, combine the image of the blue panda and the image of the blue lemon, combine the image of the pink panda and the image of the blue lemon, among other examples. Additionally, or alternatively, the plurality of combined images may include an image with an arrangement of blue panda (on a left side) and pink lemon (on a right side), an image with an arrangement of pink panda (on a left side) and blue lemon (on a right side), an image with pink panda of a first size, an image with pink panda of a second size, among other examples.

The reference system may use the neural network model to process the plurality of combined images. In some implementations, the neural network model may be trained to predict measures of memorability (e.g., memorability scores) of different images. The neural network model may include a residual neural network (ResNet) model, a deep learning technique (e.g., a faster regional convolutional neural network (R-CNN)) model, a feedforward neural network model, a radial basis function neural network model, a Kohonen self-organizing neural network model, a recurrent neural network (RNN) model, a convolutional neural network model, a modular neural network model, a deep learning image classifier neural network model, a Convolutional Neural Networks (CNNs) model, among other examples.

In some implementations, the neural network model may be trained using training data (e.g., historical and/or current) as described below in connection with FIG. 2. In some examples, the training data may include different images, data regarding features of the different images, content category data regarding categories (e.g., of content) identified by the different images, data regarding different exposure times for the different images to users, time interval between exposures of the different images, information indicating whether the users remembered the different images, among other examples.

The features of an image (of the different images) may include a contrast of the image, a color of the image, a saturation of the image (e.g., a color saturation of the image), a size of the image (e.g., a height and/or a width of the image and/or an aspect ratio of the image), a position of one or more portions of the image, a sharpness of the image, a brightness of the image, a blurriness of the image, among other examples. The categories (identified by the different images) may include goods, services, among other examples. The exposure time may refer to a period of time during which the different images is exposed (or presented) to the users.

The reference system may train the neural network model in a manner similar to the manner described below in connection with FIG. 2. Alternatively, rather than training the neural network model, the reference system may obtain the neural network model from another system or device that trained the neural network model. In this case, the other system or device may obtain the training data (discussed above) for use in training the neural network model, and may periodically receive additional data that the other system or device may use to retrain or update the neural network model.

In some examples, the reference system may provide the plurality of combined images as an input to the neural network model and the neural network model may determine (or predict), as an output, memorability scores for the plurality of combined images. For example, the reference system may provide a first combined image as an input to the neural network model and may use the neural network model to determine a memorability score for the first combined image, provide a second combined image as an input to the neural network model and may use the neural network model to determine a memorability score for the second combined image, and so on. A memorability score, of a combined image, may indicate a likelihood of the combined image being remembered after the combined image has been viewed.

In some implementations, the reference system may compare the memorability scores and the memorability threshold and may identify a memorability score that satisfies the memorability score threshold. The memorability score threshold may be based on data (e.g., historical and/or current) regarding memorability score thresholds, based on information included in the request from the user device, among other examples. In some examples, if the reference system determines that multiple memorability scores satisfy the memorability score threshold, the reference system may identify a memorability score that is a highest score out of the multiple memorability scores that satisfy the memorability score threshold. In some implementations, the reference system may select one of the plurality of combined images (e.g., associated with the selected memorability score) as the reference image.

As shown in FIG. 1D, the reference image may include a pink panda (on a left side of the reference image) and a blue lemon (on a right side of the reference image). In some implementations, the reference system may provide the reference image to the user device to confirm that the reference image is to be selected as the reference image for the URL. The reference system may receive, from the user device, information indicating that the reference image is to be selected as the reference image for the URL and, accordingly, may cause the reference image to be stored in the data structure. As example, information regarding the reference image may be stored in association with the mapping of the information identifying the two or more images and the URL.

In some implementations, the reference system may receive, from the user device, a modification to the reference image (e.g., a selection of one or more other images to replace the one or more images previously selected by the user device). In such an instance, the reference system may perform the actions described above (in connection with reference numbers 120, 125, and 130) to generate a modified image (e.g., a new reference image).

Figure 1E:
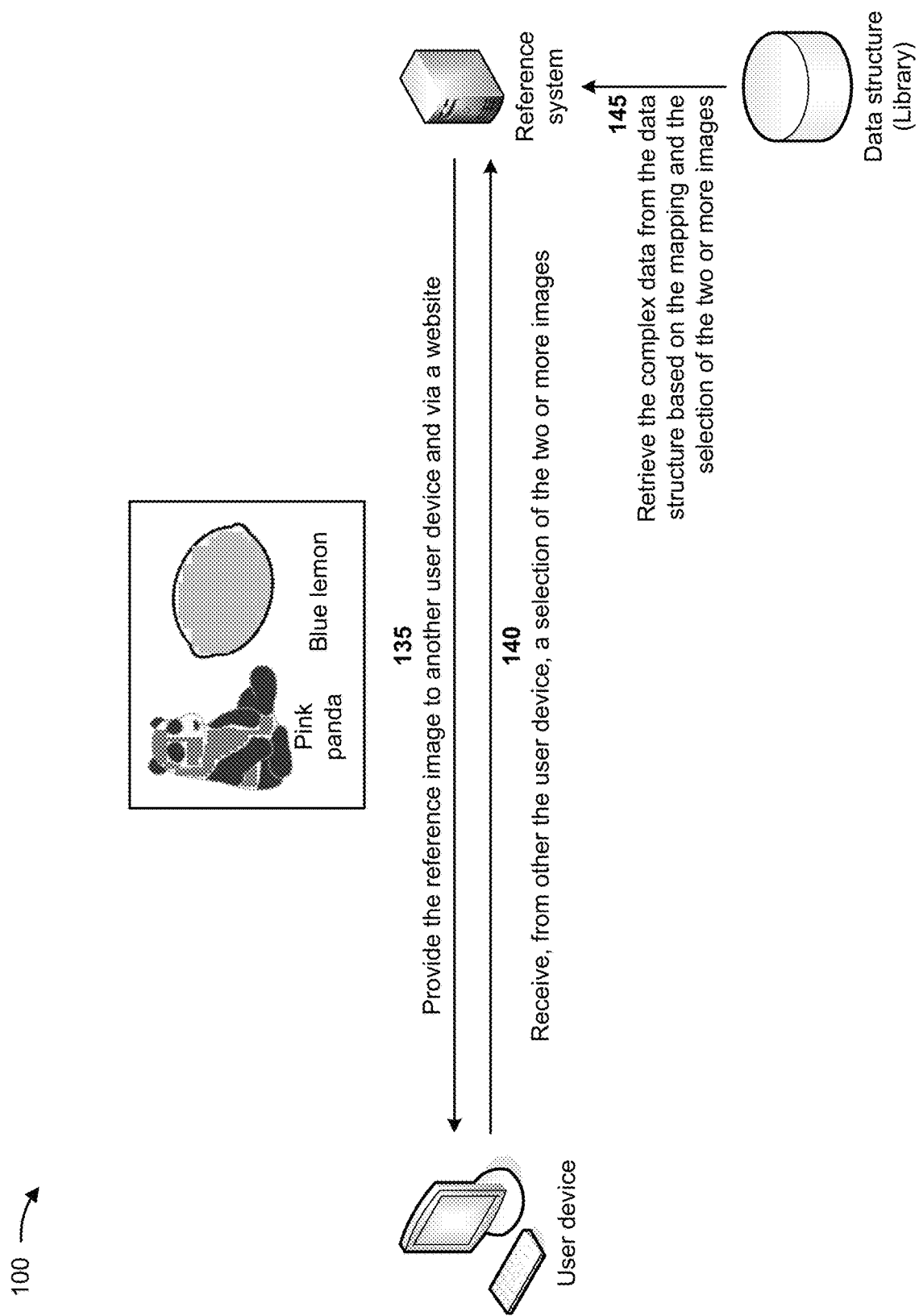

As shown in FIG. 1E, and by reference number 135, the reference system may provide the reference image to another user device and via a website. For example, assume that the reference image was not modified and that the user of the user device desires to provide the reference image to the other user device. For example, assume that the user desires to provide the reference image to prevent a phishing attack associated with the URL and/or to prevent the other user device from accessing an incorrect network resource (e.g., by incorrectly inputting the URL). The user device may cause the reference system to provide the reference image to the user device. In some implementations, the reference image may be provided via the website. As an example, the website may be an internal website of the organization.

As shown in FIG. 1E, and by reference number 140, the reference system may receive, from the other user device, a selection of the two or more images. For example, assume that a particular user of the other user device (e.g., the one or more other users or the user) desires to access the network resource associated with the URL. The particular user may cause the other user device to select the two or more images. For example, the other user device may click on the two or more images, the other user device may detect a tactile input (from the particular user) on a display of the two or more images (e.g., the particular user may tap the two or more images provided on the display), among other examples. In some implementations, the reference image may be provided to the other user device to enable the particular user to remember the combination of the two or more images that may be used to retrieve the complex data. In some examples, selection of the two or more images may cause the other user device to provide a request, for the URL, to the reference system. In some examples, the request may include information identifying the combination of the two or more images (e.g., the words pink, panda, blue, lemon), the information identifying the two or more images, among other examples.

As shown in FIG. 1E, and by reference number 145, the reference system may retrieve the complex data from the data structure based on the mapping and the selection of the two or more images. For example, the reference system may receive the request, from the other user device, based on the selection of the two or more images. Based on receiving the request, the reference system may use the information regarding the selection of the two or more images to perform a lookup of the data structure. Based on the performing the lookup of the data structure and based on the mapping, the reference system may obtain the complex data (e.g., the URL) from the data structure. The reference system may perform one or more actions based on obtaining the complex data, as described below.

In some implementations, the particular user may desire to input (e.g., via the other user device) a shortened URL corresponding to the URL instead of selecting the final image. For example, assume that the reference image is not accessible and that the particular user remembers the reference image. In such an instance, the particular user may input (e.g., via the website or via a user interface), as part of the shortened URL, information that the particular user remembers about the reference image. For example, the particular user may input a string that includes the words pink, panda, blue, and lemon, or a portion of each of the words (e.g., in any order desired by the user). As an example, the particular user may input https://xx.xx/Pink Panda is eating blue lemon, https://xx.xx/LemonBluePandaPink, among other examples.

The other user device may cause the shortened URL to be provided to the reference system. The reference system may receive the shortened URL and analyze the shortened URL to identify the words pink, panda, blue, and lemon. The reference system may perform a lookup of the data structure using a combination of the words pink, panda, blue, and lemon. Based on the performing the lookup, the reference system may determine the combination of the words pink, panda, blue, and lemon matches information included in the mapping (e.g., matches the information regarding the one or more images) which is stored in association with the complex data). Accordingly, the reference system may obtain the complex data (e.g., the URL) based on performing the lookup. In some implementations, the reference system may be configured to correct misspellings of the words included in the shortened URL prior to performing the lookup. In some implementations, the reference system may be configured to perform a lookup of the data structure to identify the complex data when the shortened URL provides an incomplete description of the reference image. For example, the reference system may perform the lookup to identify one or more mappings that include the incomplete description and provide information regarding the one or more mappings to the other user device to enable the particular user to provide a complete description of the reference image. For example, the shortened URL does not include text corresponding to one of the two or more images, the reference system may provide (e.g., to the other user device) a sequence of images (including the image) to enable the other user device to select the image. By selecting the image, the reference system may include a text (associated with the image) in the shortened URL and use the shortened URL to access the complex data, as described above.

As shown in FIG. 1F, and by reference number 135, the reference system may perform one or more actions based on the complex data. In some implementations, the one or more actions include the reference system accessing a website via the URL associated with the complex data and providing content of the website to the other user device. For example, the reference system may determine that the complex data is a URL. Based on determining that the complex data is a URL, the reference system may access the website using the URL and cause the content of the website to be provided to the other user device.

In some implementations, the one or more actions include the reference system causing a call to a telephone number associated with the complex data to be established with the other user device. For example, the reference system may determine that the complex data is a telephone number.

Based on determining that the complex data is a URL, the reference system may cause a call to be established with the other user device associated with the telephone number.

In some implementations, the one or more actions include the reference system providing text associated with the complex data to the other user device. For example, the reference system may determine that the complex data is text. Based on determining that the complex data is text, the reference system may cause the text to be provided to the other user device. For example, the text may be provided via a user interface.

In some implementations, the one or more actions include the reference system receiving feedback associated with the selection of the two or more images based on the complex data. For example, the reference system may receive the feedback from the other user device. In some instances, the feedback may indicate that the reference image is not memorable and may identify one or more changes to the reference images to improve a memorability of the reference image. The one or more changes may indicate a different type of content is more related to the URL (e.g., locations and vehicles instead of animals and fruits), may indicate that one or more features (e.g., a contrast, a size, among other examples) of the reference image are to be modified, among other examples. In some implementations, the reference system may modify the reference image based on the feedback as described above.

In some implementations, the one or more actions include the reference system retraining the neural network model based on the complex data. The reference system may utilize the complex data as additional training data for retraining the neural network model, thereby increasing the quantity of training data available for training the neural network model. Accordingly, the reference system may conserve computing resources associated with identifying, obtaining, and/or generating historical data for training the neural network model relative to other systems for identifying, obtaining, and/or generating historical data for training machine learning models. Additionally, or alternatively, utilizing the complex data as additional training data improves the accuracy and efficiency of the neural network model, thereby conserving computing resources (e.g., processing resources, memory resources, communication resources, and/or the like), networking resources, and/or other resources that would have otherwise been used if the neural network model was not updated.

By generating the reference image as described herein, the reference system conserves computing resources (e.g., processing resources, memory resources, communication resources, among other examples), networking resources, and/or other resources that would otherwise have been consumed by generating a shortened URL that is not memorable and is confusing for users, causing a device to access an incorrect network resource associated with a shortened URL (when the characters of the URL are erroneously input into the device), causing a device to access a malicious network resource associated with a phishing attack, taking remedial actions against the phishing attacks, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
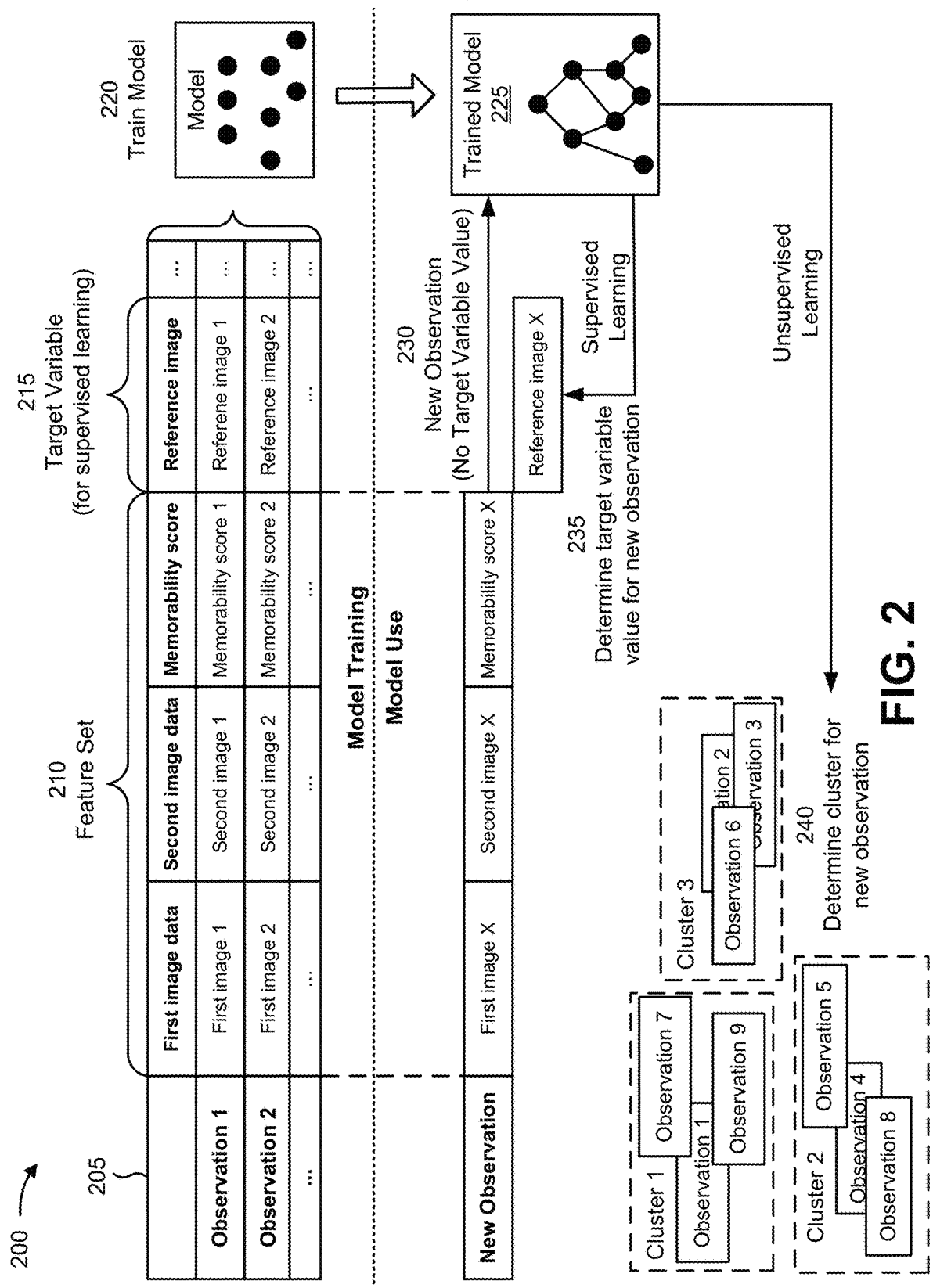
FIG. 2 is a diagram illustrating an example of training and using a machine learning model in connection with generating a reference image based on complex data.

FIG. 2 is a diagram illustrating an example 200 of training and using a machine learning model (e.g., the neural network models) in connection with generating a reference image based on a combination of images. The machine learning model training and usage described herein may be performed using a machine learning system. The machine learning system may include or may be included in a computing device, a server, a cloud computing environment, and/or the like, such as the reference system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the reference system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the reference system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a first image data, a second feature of second image data, a third feature of a memorability score, and so on. As shown, for a first observation, the first feature may have a value of first image 1, the second feature may have a value of second image 1, the third feature may have a value of memorability score 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a reference image, which has a value of reference image 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first image X, a second feature of second image X, a third feature of memorability score X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of reference image X for the target variable of the memorability score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first image data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second image data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate a reference image based on a combination of images. The machine learning system enables recognition and/or identification of tens, hundreds, thousands, or millions of features and/or feature values for tens, hundreds, thousands, or millions of observations, thereby increasing accuracy and consistency and reducing delay associated with generating a reference image based on a combination of images relative to requiring computing resources to be allocated for tens, hundreds, or thousands of operators to manually generate initiative plans.

As indicated above, FIG. 2 is provided as an example. Other examples may differ from what is described in connection with FIG. 2.

Figure 3:
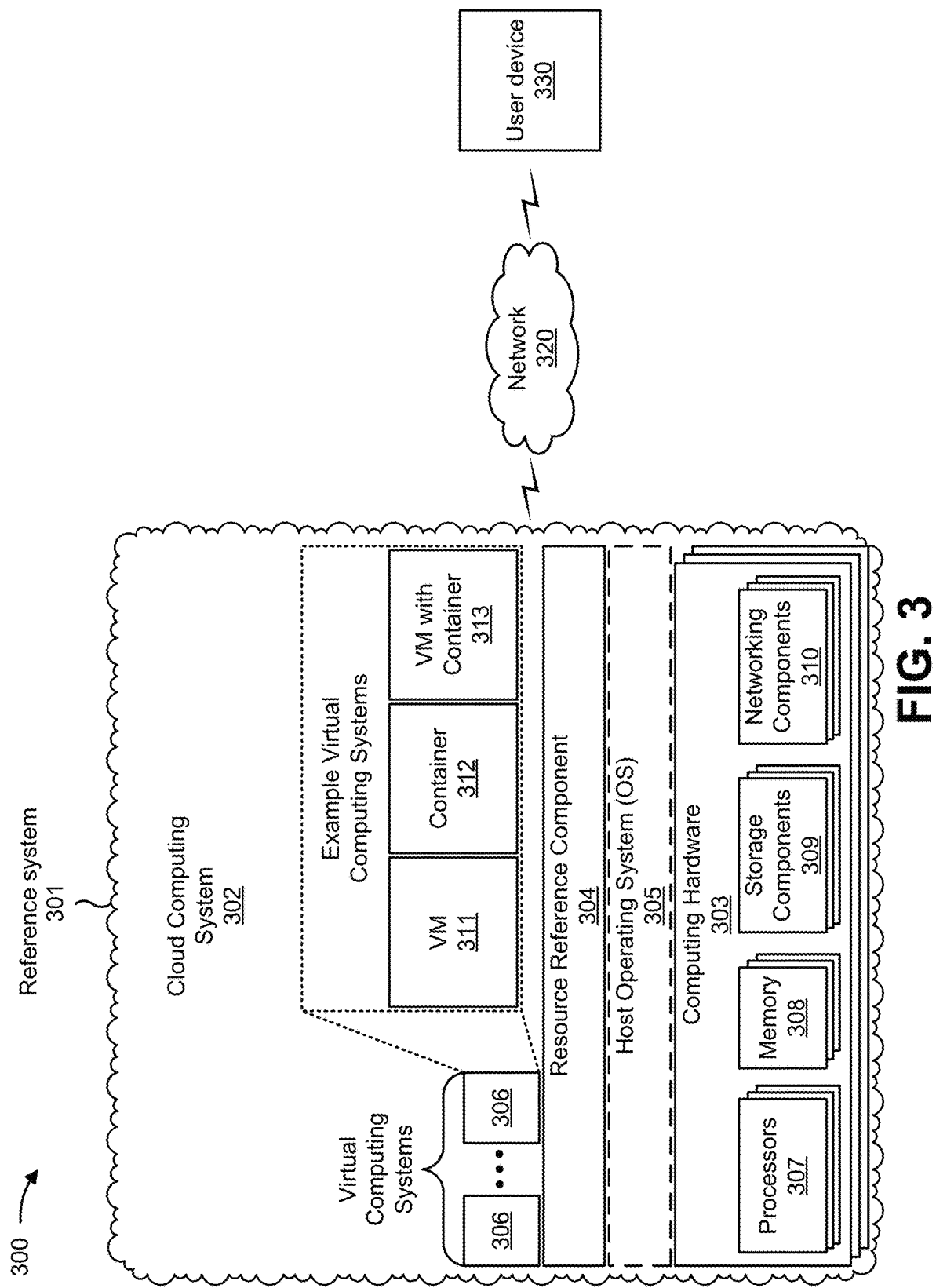
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a reference system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the reference system 301 may include one or more elements 303-313 of the cloud computing system 302, may execute within the cloud computing system 302, and/or may be hosted within the cloud computing system 302, in some implementations, the reference system 301 may not be cloud-based (e.g., may be implemented outside of a cloud computing system) or may be partially cloud-based. For example, the reference system 301 may include one or more devices that are not part of the cloud computing system 302, such as device 400 of FIG. 4, which may include a stand-alone server or another type of computing device. The reference system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
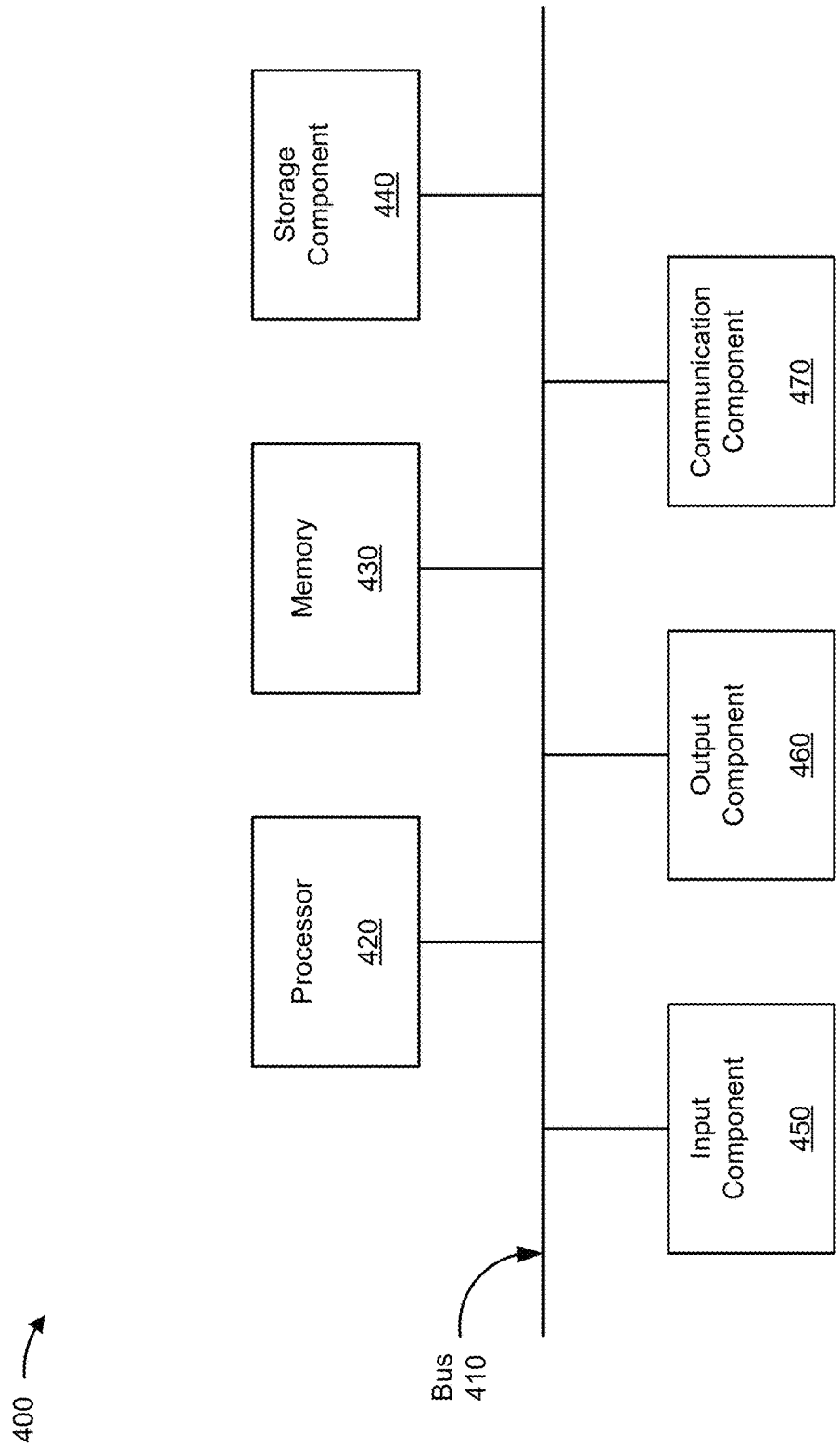
FIG. 4 is a diagram of example components of one or more devices of FIG. 3.

FIG. 4 is a diagram of example components of a device 400, which may correspond to reference system 301 and/or user device 330. In some implementations, reference system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a neural network model to generate a reference image based on a combination of images. In some implementations, one or more process blocks of FIG. 5 may be performed by a device (e.g., reference system 301). In some implementations, one or more process blocks of FIG. 5 may be performed by another device or a group of devices separate from or including the device, such as a user device (e.g., user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving complex data from a user device (block 505). For example, the device may receive complex data from a user device, as described above.

As further shown in FIG. 5, process 500 may include providing a plurality of images to the user device based on receiving the complex data (block 510). For example, the device may provide a plurality of images to the user device based on receiving the complex data, as described above. The complex data includes one or more of a uniform resource locator, a telephone number, or textual information. The plurality of images may include images associated with one or more of colors, fruits, animals, or locations.

As further shown in FIG. 5, process 500 may include receiving, from the user device, a selection of two or more images from the plurality of images (block 515). For example, the device may receive, from the user device, a selection of two or more images from the plurality of images, as described above.

As further shown in FIG. 5, process 500 may include determining whether a combination of the two or more images are stored in a data structure (block 520). For example, the device may determine whether the combination of the two or more images are stored in a data structure, as described above.

As further shown in FIG. 5, process 500 may include determining a mapping of the two or more images with the complex data, based on the combination of the two or more images not being stored in the data structure (block 525). For example, the device may determine a mapping of information identifying the two or more images with the complex data, based on the combination of the two or more images not being stored in the data structure, as described above.

As further shown in FIG. 5, process 500 may include storing information identifying the two or more images, the complex data, and the mapping in the data structure (block 530). For example, the device may store information identifying the two or more images, the complex data, and the mapping in the data structure, as described above. The mapping correlates the one or more images with the complex data.

As further shown in FIG. 5, process 500 may include processing the two or more images to generate a reference image that satisfies a memorability score threshold (block 535). For example, the device may process the two or more images, with a neural network model, to generate a reference image that satisfies a memorability score threshold, as described above. Processing the two or more images, with the neural network model, to generate the reference image includes combining the one or more images in different manners to generate a plurality of combined images, calculating a plurality of memorability scores for the plurality of combined images, and selecting one of the plurality of combined images as the reference image based on the plurality of memorability scores and the memorability score threshold.

As further shown in FIG. 5, process 500 may include providing the reference image to another user device (block 540). For example, the device may provide the reference image to another user device, as described above. Providing the final image to the other user device may comprise providing the final image to the other user device via a website.

As further shown in FIG. 5, process 500 may include receiving, from the other user device, a selection of the two or more images (block 545). For example, the device may receive, from the other user device, a selection of the two or more images, as described above.

As further shown in FIG. 5, process 500 may include retrieving the complex data from the data structure based on the mapping and based on the selection of the two or more images (block 550). For example, the device may retrieve the complex data from the data structure based on the mapping and based on the selection of the reference image, as described above.

As further shown in FIG. 5, process 500 may include performing one or more actions based on the complex data (block 555). For example, the device may perform one or more actions based on the complex data, as described above. Performing the one or more actions may include accessing a website via a uniform resource locator associated with the complex data, and providing the website to the other user device. Performing the one or more actions may include receiving, from the other user device, feedback associated with the final image, based on the complex data, and modifying the final image based on the feedback.

Performing the one or more actions includes causing a call to a telephone number associated with the complex data to be placed by the other user device. Performing the one or more actions may include one or more of providing text associated with the complex data to the other user device, or retraining the neural network model based on the complex data. In some implementations, process 500 may include requesting, from the user device, a new selection of one or more new images, from the plurality of images, based on the one or more images conflicting with the images stored in the data structure.

In some implementations, process 500 may include processing the one or more images, with the neural network model, to generate the final image includes combining the one or more images in different manners to generate a plurality of combined images, calculating a plurality of memorability scores for the plurality of combined images, and selecting one of the plurality of combined images as the final image based on the plurality of memorability scores and the memorability score threshold.

In some implementations, process 500 may include providing the final image to the user device prior to providing the final image to the other user device, receiving, from the user device, a modification to the final image, and modifying the final image based on the modification prior to providing the final image to the other user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, complex data from a user device;
    providing, by the device, a plurality of images to the user device based on receiving the complex data;
    receiving, by the device and from the user device, a selection of two or more images from the plurality of images;
    determining, by the device, whether a combination of the two or more images is stored in a data structure;
    determining, by the device, a mapping of the two or more images with the complex data, based on the combination of the two or more images not being stored in the data structure;
    storing, by the device, information identifying the two or more images, the complex data, and the mapping in the data structure;
    processing, by the device, the two or more images to generate a reference image that satisfies a memorability score threshold;
    providing, by the device, the reference image to another user device;
    receiving, by the device and from the other user device, a selection of the two or more images;
    retrieving, by the device, the complex data from the data structure based on the mapping and based on the selection of the two or more images; and
    performing, by the device, one or more actions based on the complex data.

2. The method of claim 1, wherein the complex data includes one or more of:
    a uniform resource locator,
    a telephone number, or
    textual information.

3. The method of claim 1, wherein the two or more images are processed with a neural network model to generate the reference image.

4. The method of claim 1, further comprising:
    requesting, from the user device, a new selection of two or more new images, from the plurality of images, based on the combination of the two or more images being stored in the data structure.

5. The method of claim 1, wherein processing the two or more images to generate the reference image comprises:
    combining the two or more images in different manners to generate a plurality of combined images;
    calculating, using a neural network model, a plurality of memorability scores for the plurality of combined images; and
    selecting one of the plurality of combined images as the reference image based on the plurality of memorability scores and the memorability score threshold.

6. The method of claim 1, further comprising:
    providing the reference image to the user device prior to providing the reference image to the other user device;
    receiving, from the user device, a modification to the reference image; and
    modifying the reference image based on the modification prior to providing the reference image to the other user device.

7. The method of claim 1, wherein providing the reference image to the other user device comprises:
    providing the reference image to the other user device via a website.

8. A device, comprising:
    one or more memories; and
    one or more processors, communicatively coupled to the one or more memories, when performing one or more actions, configured to:
        receive complex data from a user device,
            wherein the complex data includes one or more of:
                a uniform resource locator, a telephone number, or
textual information;

provide a plurality of images to the user device based on receiving the complex data;

receive, from the user device, a selection of two or more images from the plurality of images;

determine whether a combination of the two or more images is stored in a data structure;

determine a mapping of the two or more images with the complex data, based on the combination of the two or more images not being stored in the data structure;

store information identifying the two or more images, the complex data, and the mapping in the data structure;

process the two or more images to generate a reference image that satisfies a memorability score threshold;

provide the reference image to another user device;

receive, from the other user device, a selection of the two or more images;

retrieve the complex data from the data structure based on the mapping and based on the selection of the two or more images; and perform one or more actions based on the complex data.

9. The device of claim 8, wherein the one or more processors, when performing the one or more actions, are configured to:
  access a website via a uniform resource locator associated with the complex data; and
  provide the website to the other user device.

10. The device of claim 8, wherein the one or more processors, when performing the one or more actions, are configured to:
  receive, from the other user device, feedback associated with the reference image, based on the complex data; and
  modify the reference image based on the feedback.

11. The device of claim 8, wherein the one or more processors, when performing the one or more actions, are configured to:
  cause a call to a telephone number associated with the complex data to be established with the other user device.

12. The device of claim 8, wherein the two or more images are processed with a neural network model to generate the reference image;
  wherein the one or more processors, when performing the one or more actions, are configured to one or more of:
    provide text associated with the complex data to the other user device; or
    retrain the neural network model based on the complex data.

13. The device of claim 8, wherein the mapping correlates the two or more images with the complex data.

14. The device of claim 8, wherein the one or more processors are further configured to:
  request, from the user device, a new selection of two or more new images, from the plurality of images, based on the combination of the two or more images being stored in the data structure.

15. A non-transitory computer-readable medium storing a set of instructions, the set of instructions comprising:
  one or more instructions that, when executed by one or more processors of a device, cause the device to:
    receive complex data from a user device;
    provide a plurality of images to the user device based on receiving the complex data;
    receive, from the user device, a selection of two or more images from the plurality of images;
    determine whether a combination of the two or more images is stored in a data structure;
    determine a mapping of the two or more images with the complex data, based on the combination of the two or more images not being stored in the data structure;
    store information identifying the two or more images, the complex data, and the mapping in the data structure;
    process the two or more images to generate a reference image that satisfies a memorability score threshold; and
    provide the reference image to another user device.

16. The non-transitory computer-readable medium of claim 15, wherein the one or more instructions further cause the device to:
  receive, from the other user device, a selection of the two or more images;
  retrieve the complex data from the data structure based on the mapping and based on the selection of the two or more images; and
  perform one or more actions based on the complex data.

17. The non-transitory computer-readable medium of claim 15, wherein the one or more instructions further cause the device to:
  request, from the user device, a new selection of two or more new images, from the plurality of images, based on the combination of the two or more images being stored in the data structure.

18. The non-transitory computer-readable medium of claim 15, wherein the one or more instructions, that cause the device to process the two or more images to generate the reference image, cause the device to:
  combine the one or more images in different manners to generate a plurality of combined images;
  calculate, using a neural network model, a plurality of memorability scores for the plurality of combined images; and
  select one of the plurality of combined images as the reference image based on the plurality of memorability scores and the memorability score threshold.

19. The non-transitory computer-readable medium of claim 15, wherein the one or more instructions further cause the device to:
  provide the reference image to the user device prior to providing the reference image to the other user device;
  receive, from the user device, a modification to the reference image; and
  modify the reference image based on the modification prior to providing the reference image to the other user device.

20. The non-transitory computer-readable medium of claim 15, wherein the complex data includes one or more of:
  a uniform resource locator,
  a telephone number, or
  textual information.

* * * * *